(12) United States Patent
Figenschou et al.

(10) Patent No.: US 7,473,844 B2
(45) Date of Patent: Jan. 6, 2009

(54) SUBSEA UMBILICAL

(75) Inventors: Arild Figenschou, Billingstad (NO);
Finn Petter Gjerull, Høvik (NO)

(73) Assignee: Aker Kvaerner Subsea AS (NO)

( * ) Notice: Subject to any disclaimer, the term of this patent is extended or adjusted under 35 U.S.C. 154(b) by 57 days.

(21) Appl. No.: 10/560,925

(22) PCT Filed: Jun. 11, 2004

(86) PCT No.: PCT/NO2004/000171

§ 371 (c)(1),
(2), (4) Date: Dec. 15, 2005

(87) PCT Pub. No.: WO2004/111515

PCT Pub. Date: Dec. 23, 2004

(65) Prior Publication Data

US 2006/0137880 A1    Jun. 29, 2006

(30) Foreign Application Priority Data

Jun. 16, 2003    (NO) .................................. 20032728

(51) Int. Cl.
*F16L 11/12* (2006.01)
*H01B 7/00* (2006.01)

(52) U.S. Cl. ................. 174/47; 174/110 R; 174/113 R; 174/113 C

(58) Field of Classification Search .................. 174/47, 174/15.6, 15.7, 19, 113 C, 113 A, 102 R; 385/105, 110, 112, 114; 138/113
See application file for complete search history.

(56) References Cited

U.S. PATENT DOCUMENTS 4,196,307 A * 4/1980 Moore et al. .................. 174/47
5,218,016 A * 6/1993 Jarrin et al. .................. 523/219
5,813,106 A * 9/1998 Haug et al. .................... 29/429
5,902,958 A * 5/1999 Haxton ......................... 174/47
6,046,404 A    4/2000 Figenschou et al.

(Continued)

FOREIGN PATENT DOCUMENTS

EP    0 627 027    4/1998

(Continued)

OTHER PUBLICATIONS

International Search Report for PCT/NO2004/000171 dated Oct. 8, 2004.

(Continued)

*Primary Examiner*—William H Mayo, III
(74) *Attorney, Agent, or Firm*—Nixon & Vanderhye PC

(57) ABSTRACT

A marine, flexible, integrated umbilical (for control, injection or production) including a number of fluid flow pipes (7; 7'; 7'') and optionally electric conductors (8; 8'), and a filler material between the fluid flow pipes and the possible electric conductors. The filler material includes several inner and outer channel elements (2, 3, 4; 6, 9; 6', 9') being twisted about the longitudinal axis of the umbilical and assembled such that they form channels (11; 11'; 11'') for receiving the fluid flow pipes and the possible electric conductors. An outer sheath (1; 1'; 1'') of suitable material is present outside the filler material. An armouring and weight applying band is wrapped around the filler material and is laid between the filler material and the outer sheath (1; 1'; 1'') in the finished umbilical (10).

9 Claims, 3 Drawing Sheets

U.S. PATENT DOCUMENTS

| | | | |
|---|---|---|---|
| 6,146,052 | A | 11/2000 | Jacobsen et al. |
| 6,239,363 | B1 * | 5/2001 | Wooters ........................ 174/47 |
| 6,283,206 | B1 * | 9/2001 | Fraser et al. ............. 166/242.3 |
| 6,472,614 | B1 * | 10/2002 | Dupont et al. ............. 174/70 S |
| 6,526,086 | B1 * | 2/2003 | Wakabayashi et al. ........ 372/69 |
| 6,612,370 | B1 | 9/2003 | Jahnsen |
| 6,901,968 | B2 | 6/2005 | Thomson |
| 6,940,054 | B1 * | 9/2005 | Heggdal ..................... 219/629 |
| 6,943,300 | B2 * | 9/2005 | Ekeberg et al. ......... 174/113 R |
| 6,973,244 | B2 * | 12/2005 | Karlsen ....................... 385/100 |
| 2003/0103811 | A1 | 6/2003 | Grimseth |
| 2003/0116212 | A1 | 6/2003 | Thomson |

FOREIGN PATENT DOCUMENTS

| | | |
|---|---|---|
| WO | 99/57413 | 11/1999 |

OTHER PUBLICATIONS

Norwegian Search Report for 2003 2728 dated Jan. 30, 2004.

* cited by examiner

SUBSEA UMBILICAL

This application is the US national phase of international application PCT/NO2004/000171 filed 11 Jun. 2004 which designated the U.S. and claims benefit of NO 2003 2728, filed 16 Jun. 2003, the entire contents of each of which are hereby incorporated by reference.

BACKGROUND OF THE INVENTION

The present invention relates to a marine, flexible, integrated umbilical (for control, injection or production), which umbilical comprises a number of fluid flow pipes and optionally electric conductors, filler material between the fluid flow pipes and the possible electric conductors, which filler material comprises several inner and outer channel elements that are twisted about the longitudinal axis of the umbilical and are assembled such that they form channels for receipt of the fluid flow pipes and the possible electric conductors, said pipes and conductors being axially free movable within the channels, and an outer sheath of suitable material.

Complete umbilicals of this type and how they are manufactured are disclosed in WO93/171776.

Such umbilicals are designed for subsea use to transfer fluid, and optionally electric energy, hydraulic liquid and electric signals one or both ways. As used here the term "umbilical" is intended to encompass a flexible or bendable bundle of pipes and cables that includes a plurality of transfer lines like electric conductors, both for energy and signals, and fluid flow pipes, both for liquid and gas.

Such fluid flow pipes will typically be of smaller diameter and made of steel, and may, as an example, be used for high pressure hydraulic liquid to actuate equipment, like valves, on the seabed. Traditionally they further include a central steel pipe of larger diameter for transportation of larger amounts of liquid, like methanol, for injection into a gas or oil well. One or more of the flow pipes can also be used for chemicals to be injected into a formation or return of "used" liquid. In an alternative embodiment the central steel pipe may be replaced by a load carrying element, such as a steel wire.

Umbilicals of this type are exampled and disclosed in the above mentioned publication. It is, however, not decisive that the umbilical comprises electric conductors in the transversal cross section and it is conceivable as a bundle of pipes, possibly with a centrally located pipe of substantial dimension for transportation of produced oil and gas to the surface in the same way as a riser. Such a flowline, or production tubing, is termed IPU™ (Integrated Production Umbilical).

An early use of such umbilicals was between a surface vessel and a submerged remote operated vessel (ROV).

A need has existed to improve the impact resistance of the outer sheath of the umbilical, which is normally made of a plastic material.

Moreover it has been common that such umbilicals include weight elements merely to ad sufficient weight so that they shall not become buoyant. The weight elements have usually been made of lead and have been integrated into the umbilical as part of same. Naturally this has provided substantial additional costs to the umbilical.

SUMMARY OF THE INVENTION

According to the present invention the two above addressed problems are solved by an umbilical of the introductorily mentioned type that are distinguished in that an armouring and weight adding band is wrapped around the filler material and is located between the filler material and the outer sheath of the finished umbilical.

Preferably is the armouring and weight adding band made of a metallic material, such as a band of steel.

During fabrication the armouring and weight adding band is preferably cross laid around the filler material, optionally in several layers.

In a useful embodiment of the invention the armouring and weight adding band has a typical width in the order of 40-60 mm and thickness in the order of 0.6-1.0 mm.

BRIEF DESCRIPTION OF THE DRAWINGS

Other and further objects, features and advantages will appear from the following description of one for the time being preferred embodiment of the invention, which is given for the purpose of description, without thereby being limiting, and given in context with the appended drawings where.

DETAILED DESCRIPTION OF THE INVENTION

Figure 1:
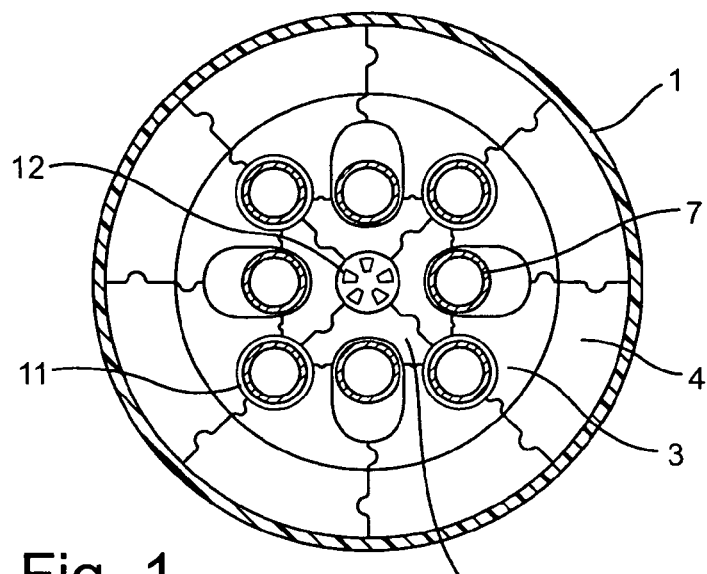
FIG. 1 shows schematically a transversal cross section through an umbilical of the type that can be used with the present invention.

FIG. 1 shows a transversal cross section through a typical umbilical. The umbilical has an outer sheath 1 made of plastic material, like extruded PE. Longitudinally extending inner, intermediate and outer channel elements 2, 3, 4 of plastic material are placed adjacent to each other and have such a design that they lock against displacement when they are assembled in a ring internal of the outer sheath 1. The channel elements 2, 3, 4 form longitudinally extending channels 11 for receipt of a number of fluid flow pipes 7 respectively. The fluid flow pipes 7 have slightly less outer diameter than the diameter of the channels 11 formed between the channel elements 2, 3, 4. This enables the fluid flow pipes 7 to be axially free moveable within the channels 11 between the channel elements 2, 3, 4. A load carrying element 12 may optionally be centrally placed within the umbilical.

The umbilical is manufactured such that the channel elements 2, 3, 4 and the fluid flow pipes 7 are twisted, or more correctly laid, around the central load carrying element 12. It will be normal to have a laying length of approximately 5-10 meter, but the invention is not limited to such lengths. By a laying length of 10 meter is it meant that the fluid flow pipes 7 and the channel elements 2, 3, 4 has been twisted (laid) one revolution around the central element 12 over a length of 10 meters of the umbilical. This laying, together with the axially freedom of motion of the fluid flow pipes 7 within the channels 11, provides the ability of flexing and coiling the umbilical in the same way as flexing a wire.

Figure 2:
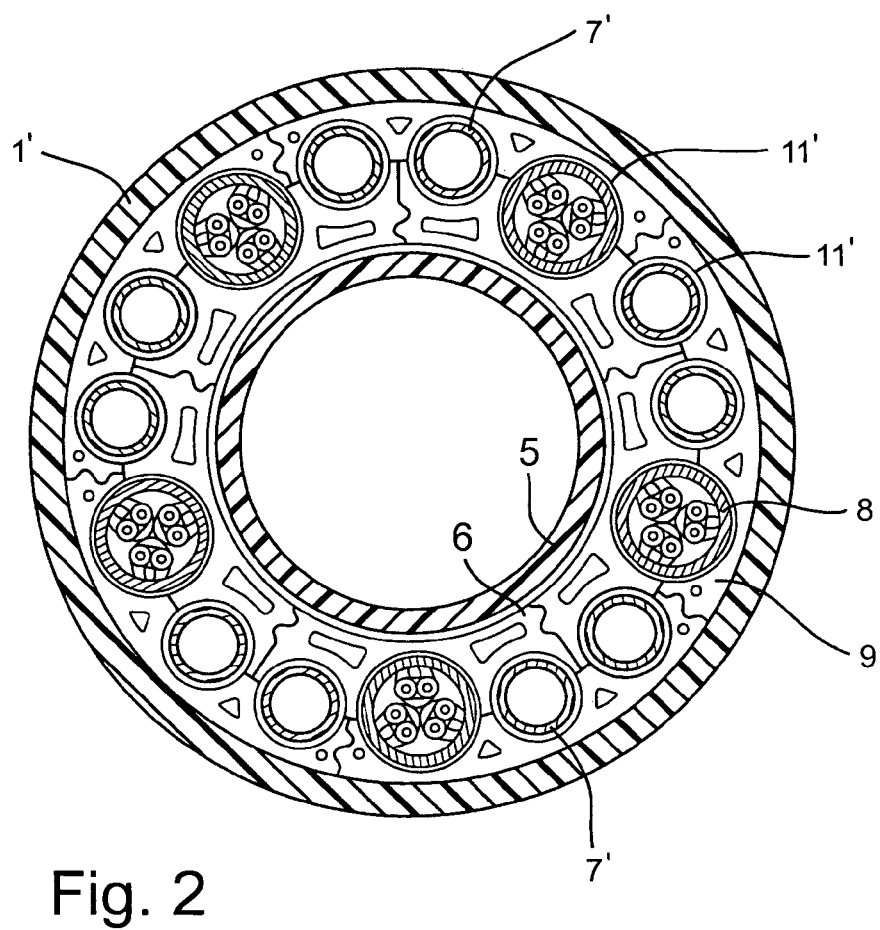
FIG. 2 shows schematically a transversal cross section through an umbilical of a type for fluid injection that can be used with the present invention.

FIG. 2 shows a transversal cross section through a second version of an umbilical of the type injection umbilical. Like the umbilical above, this umbilical also has an outer sheath 1' made of plastic material, like extruded PE. Longitudinally extending inner and outer channel elements 6, 9 of plastic material are placed adjacent to each other and have such a design that they lock against displacement when they are assembled in a ring internal of the outer sheath 1'. The channel elements 6, 9 form longitudinally extending channels 11' for receipt of a number of fluid flow pipes 7' and a number of electric conductors 8 respectively. The fluid flow pipes 7' and the electric conductors 8 have slightly less outer diameter than the diameter of the channels 11' formed between the channel elements 6, 9. This enables the fluid flow pipes 7' and the electric conductors 8 to be axially free moveable within the channels 11' between the channel elements 6, 9. A main fluid flow line 5 extends centrally through the umbilical. FIG. 2 is typical and illustrative for an injection umbilical used for downhole injection of methanol via the fluid flow line 5.

The injection umbilical is manufactured such that the channel elements 6, 9, the fluid flow pipes 7' and the electric conductors 8 are twisted, or laid, around the central fluid flow line 5. Also here it will be usual to have a laying length of approximately 5-10 meters.

Figure 3:
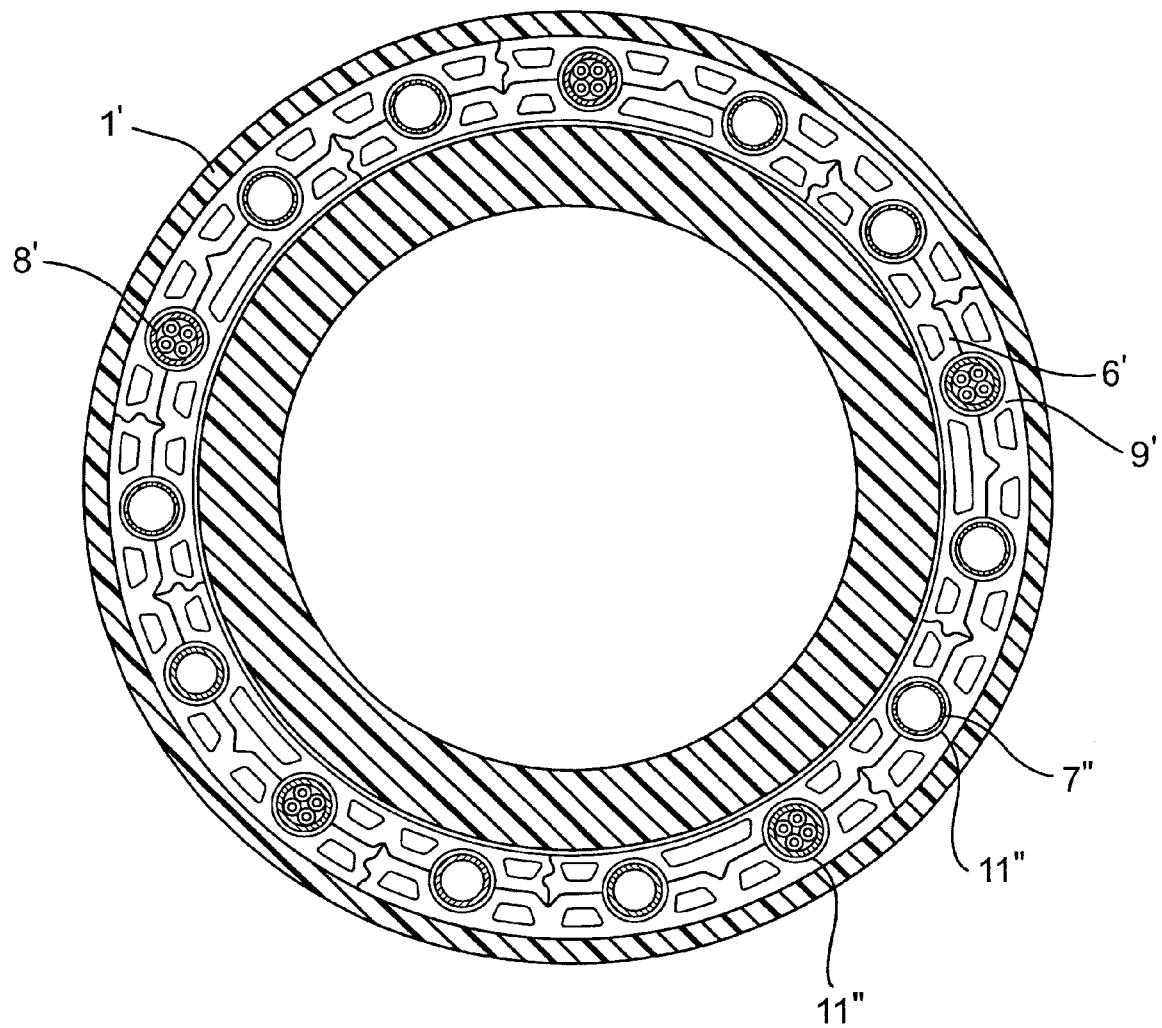
FIG. 3 shows schematically a transversal cross section through an umbilical of the type integrated production tubing that can be used with the present invention.

FIG. 3 shows a transversal cross section through a third version of an umbilical of the type integrated production umbilical, which by the assignee of the present invention has been denoted as IPU™ (Integrated Production Umbilical). Like the umbilicals above, this umbilical also has an outer sheath 1" made of plastic material, like extruded PE. Longitudinally extending inner and outer channel elements 6', 9' of plastic material are placed adjacent to each other and have such a design that they lock against displacement when they are assembled in a ring internal of the outer sheath 1". The channel elements 6', 9' form longitudinally extending channels 11" for receipt of a number of fluid flow pipes 7" and a number of electric conductors 8' respectively. The fluid flow pipes 7" and the electric conductors 8' have slightly less outer diameter than the diameter of the channels 11" formed between the channel elements 6', 9'. This enables the fluid flow pipes 7" and the electric conductors 8' to be axially free moveable within the channels 11" between the channel elements 6', 9'. A main fluid flow line 5' extends centrally through the umbilical. The fluid flow line 5' is of substantial dimensions and FIG. 3 is typical and illustrative for an umbilical that is used for production of oil or gas from a well.

The production umbilical is manufactured such that the channel elements 6', 9', the fluid flow pipes 7" and the electric conductors 8' are twisted, or laid, around the central fluid flow line 5'. Also here it will be usual to have a laying length of approximately 5-10 meters.

Figure 4:
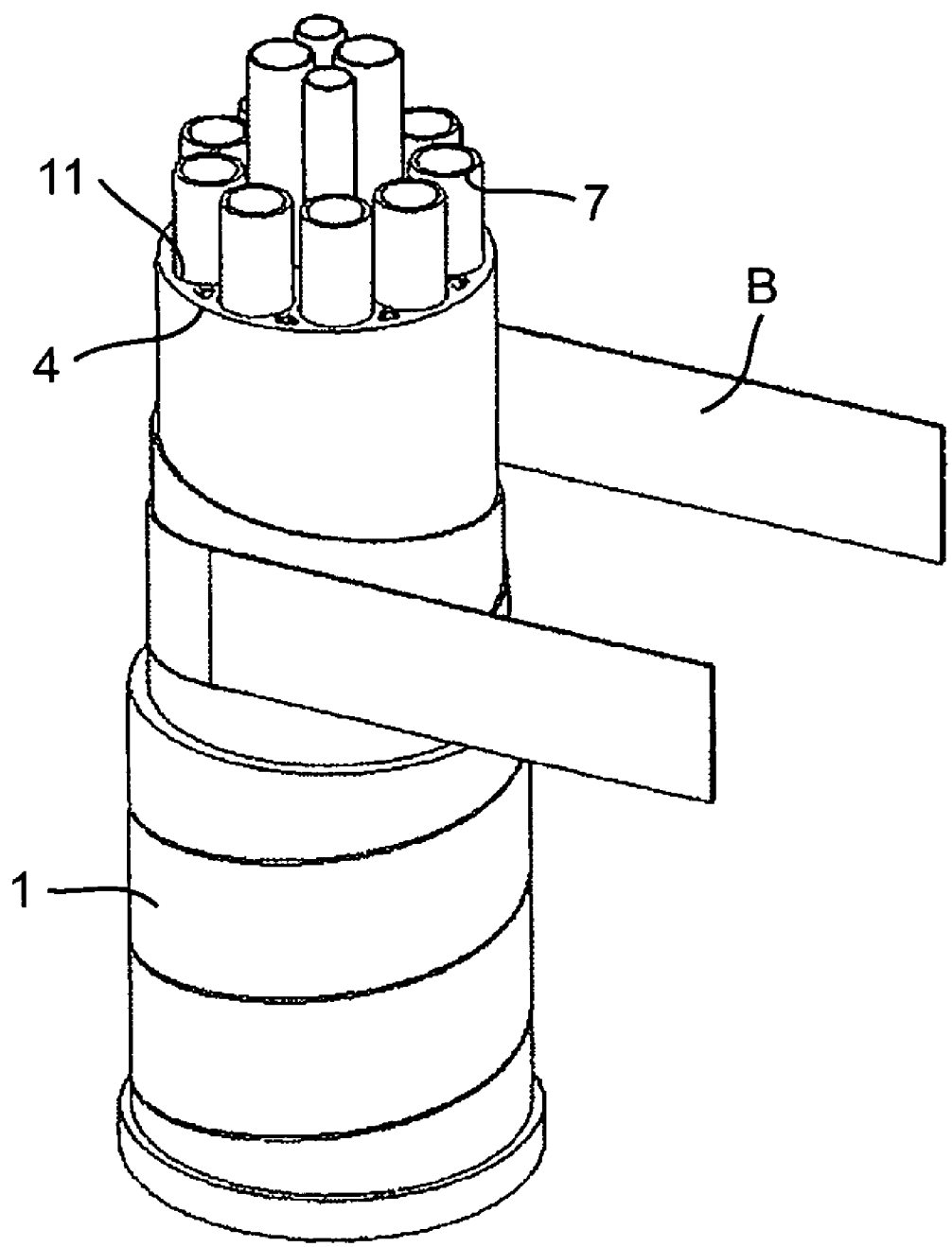
FIG. 4 shows schematically in perspective an umbilical having two bands that are wrapped around the filler material according to the present invention.

FIG. 4 shows a cut out of a schematic example of a marine, flexible, integrated umbilical 10, such as a control cable, injection umbilical, production umbilical or production tubing, according to the present invention. The umbilical 10 comprises a number of fluid flow pipes 7, and optionally electric conductors (not shown), a filler material 4 between the fluid flow pipes 7 and the possible electric conductors.

The filler material, as more evident shown in FIG. 1, includes several inner and outer channel elements 2, 3 and 4 that are twisted around the longitudinal axis of the umbilical 10. The channel elements are such assembled that they form channels 11 for receipt of the fluid flow pipes 7 and the possible electric conductors. The pipes and the conductors are axially free moveable within the channels 11. In addition the filler material is enclosed by an external sheath 1 of suitable material, such as PE. An armouring and weight adding band B is wrapped around the filler material 4 and is located between the filler material 4 and the external sheath 1 of the finished umbilical.

Normally the armouring and weight adding band B will be made of a metallic material, such as steel. During fabrication the armouring and weight adding band B is preferably cross laid around the filler material 4, optionally in several layers. Without being a limitation, the armouring and weight adding band B will typically have a width in the order of 40-60mm and thickness in the order of 0.6-1.0 mm.

The invention claimed is:

1. A marine, flexible, integrated umbilical comprising:
   a number of fluid flow pipes,
   filler material between the fluid flow pipes, said filler material comprising several inner and outer channel elements being twisted about the longitudinal axis of the umbilical and assembled such that they form channels for receipt of the fluid flow pipes, said pipes being axially free movable within the channels, and an outer sheath of suitable material,
   wherein an armouring and weight adding band is wrapped around the filler material along an entire length thereof so as to be between the filler material and the outer sheath in the finished umbilical along an entire length of the umbilical.

2. A marine, flexible, integrated umbilical according to claim 1, wherein the armouring and weight adding band is made of a metallic material.

3. A marine, flexible, integrated umbilical according to claim 2, wherein the armouring and weight adding band is a band of steel.

4. A marine, flexible, integrated umbilical according to claim 2, wherein the armouring and weight adding band is cross laid around the filler material.

5. A marine, flexible, integrated umbilical according to claim 2, characterized in that the armouring and weight adding band has a width in the order of 40-60 mm and thickness in the order of 0.6-1.0 mm.

6. A marine, flexible, integrated umbilical according to claim 1, wherein the armouring and weight adding band is cross laid around the filler material.

7. A marine, flexible, integrated umbilical according to claim 6, wherein the armouring and weight adding band is laid around the filler material in several layers.

8. A marine, flexible, integrated umbilical according to claim 1, characterized in that the armouring and weight adding band has a width in the order of 40-60 mm and thickness in the order of 0.6-1.0 mm.

9. A marine, flexible, integrated umbilical according to claim 1, further comprising a plurality of electric conductors, said filler material being disposed between the fluid flow pipes and the electric conductors, said filler material forming channels for receipt of the electrode conductors, said conductors being axially free movable within the channels.

* * * * *